US010882625B2

(12) United States Patent
Farouz-Fouquet (10) Patent No.: US 10,882,625 B2
(45) Date of Patent: Jan. 5, 2021

(54) WING COMPRISING A LEADING EDGE HAVING MEANS FOR PREVENTING THE DEPOSITION OF RESIDUES

(71) Applicant: Airbus Operations SAS, Toulouse (FR)

(72) Inventor: Mathias Farouz-Fouquet, Toulouse (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 352 days.

(21) Appl. No.: 16/050,780

(22) Filed: Jul. 31, 2018

(65) Prior Publication Data

US 2019/0039741 A1 Feb. 7, 2019

(30) Foreign Application Priority Data

Aug. 3, 2017 (FR) .................................... 17 57487

(51) Int. Cl.
| | |
|---|---|
| *B64D 15/12* | (2006.01) |
| *H05B 6/80* | (2006.01) |
| *B64D 15/20* | (2006.01) |
| *H05H 1/24* | (2006.01) |
| *H05H 1/46* | (2006.01) |
| *B64C 23/00* | (2006.01) |

(52) U.S. Cl.
CPC ............ *B64D 15/12* (2013.01); *B64C 23/005* (2013.01); *B64D 15/20* (2013.01); *H05B 6/80* (2013.01); *H05H 1/2406* (2013.01); *H05H 1/46* (2013.01); *B64C 2230/12* (2013.01); *H05B 2214/02* (2013.01); *H05H 2001/2412* (2013.01); *H05H 2001/4607* (2013.01)

(58) Field of Classification Search
CPC ... B64D 15/00; B64C 23/005; B64C 2230/12; B64C 2230/22; B64C 21/08; B64C 21/04; B64C 23/06; B64C 2230/02; F15D 1/0065; F15D 1/0055; F15D 1/0075
See application file for complete search history.

(56) References Cited

U.S. PATENT DOCUMENTS

2006/0131282 A1\* 6/2006 Miller .................. F03H 1/0062
219/121.5
2015/0083863 A1 3/2015 Karthäuser et al.

FOREIGN PATENT DOCUMENTS

| WO | 2013172762 | 11/2013 |
|---|---|---|
| WO | 2017069617 | 4/2017 |

OTHER PUBLICATIONS

French Search Report, dated Mar. 15, 2018, priority document.

\* cited by examiner

*Primary Examiner* — Joshua J Michener
*Assistant Examiner* — Cindi M Curry
(74) *Attorney, Agent, or Firm* — Greer, Burns & Crain, Ltd.

(57) ABSTRACT

A wing comprising a leading edge composed of a skin transparent to microwaves, magnetrons implanted under the skin and arranged in rows and in columns alongside one another, between two successive rows of magnetrons, a discharge row successively comprising an electrode and a ground electrode, where each electrode passes through the skin and where each ground electrode is under the skin.

10 Claims, 5 Drawing Sheets

WING COMPRISING A LEADING EDGE HAVING MEANS FOR PREVENTING THE DEPOSITION OF RESIDUES

CROSS-REFERENCES TO RELATED APPLICATIONS

This application claims the benefit of the French patent application No. 1757487 filed on Aug. 3, 2017, the entire disclosures of which are incorporated herein by way of reference.

TECHNICAL FIELD

The present invention relates to a wing comprising a leading edge and means for preventing the deposition of residues on the leading edge, and an aircraft comprising at least one such wing.

BACKGROUND OF THE INVENTION

An aircraft wing comprises a leading edge which is the front part of the aerodynamic profile forming the wing. This leading edge is often subject to the deposition of organic residues which disrupt the flow of air along the leading edge. The flow of air is then no longer laminar but turbulent.

For some aircraft constructors, it is known practice to use a scraper which is displaced along the leading edge, but such an installation is not acceptable for a commercial aircraft.

SUMMARY OF THE INVENTION

One object of the present invention is to propose a wing comprising a leading edge which is equipped with means making it possible to eliminate the organic deposits.

To this end, a wing of an aircraft is proposed, the wing comprising:
- a leading edge composed of a skin transparent to microwaves,
- a plurality of magnetrons which are implanted under the skin and arranged in rows and in columns alongside one another,
- at least one power module provided to electrically power the plurality of magnetrons,
- between two successive rows of magnetrons, a discharge row successively comprising an electrode and a ground electrode, where each electrode passes through the skin and where each ground electrode is under the skin,
- for each group composed of an electrode of a discharge row and of at least one ground electrode of an adjacent discharge row, a voltage generator connected between the electrode and the at least one ground electrode.

Such an installation makes it possible to eliminate the residues which are attached to the leading edge, whether these residues are organic or ice.

Advantageously, the skin is two-layer and comprises a flexible outer layer and an inner layer which ensures its strength.

Advantageously, the leading edge comprises a displacement system provided to displace the leading edge upwards and downwards.

Advantageously, the inner layer is pierced by a window in which is housed the ground electrode, the ground electrode comprises an outer plate, an inner plate, each having dielectric properties, and an electrically conductive plate, secured to an electrically conductive rod and sandwiched between the outer plate and the inner plate, and two bolts sandwiching, on the one hand, the outer plate, the plate and the inner plate, and, on the other hand, the inner layer, and the inner plate is pierced by a bore into which the rod passes to be connected to the voltage generator.

Advantageously, the inner layer has a void open towards the interior of the leading edge and in which is housed the ground electrode, the ground electrode comprises a plate having dielectric properties and an electrically conductive plate, secured to an electrically conductive rod and sandwiched between the bottom of the void and the plate, and the plate is pierced by a bore into which the rod passes to be connected to the voltage generator.

Advantageously, the outer layer has a hole, the inner layer has a through-bore with a countersink on the side of its outer face, the electrode takes the form of a rod with flat head where the flat head is accommodated in the hole of the outer layer, the wing comprises:
- a main stem having a threaded rod passing through the bore and a countersunk head accommodated in the countersink, and where the interior of the main stem is tapped,
- a secondary stem which is accommodated in the main stem, where the outer face is threaded to cooperate with the inner tapping of the main stem, and where the secondary stem extends beyond the main stem on the side opposite the head of the main stem,
- a first nut which is screwed onto the end of the secondary stem which extends beyond the main stem and which bears against the main stem,
- the interior of the secondary stem accommodates the rod of the electrode which extends beyond the secondary stem beyond the first nut to be connected to the voltage generator.

Advantageously, the wing comprises:
- for each magnetron, a waveguide fixed inside the leading edge, produced in the form of an outwardly-open cup and whose bottom bears an emitting antenna of the magnetron oriented towards the opening of the cup which has a flange,
- a first clamping nut which is screwed onto the threaded rod of the main stem, between the second nut and the inner layer, and bears against the inner layer,
- a second clamping nut which is screwed onto the threaded rod of the main stem, between the second nut and the first clamping nut, and is tightened against the first clamping nut, sandwiching the flange.

Advantageously, the wing comprises, for each magnetron, a waveguide fixed inside the leading edge, produced in the form of an outwardly-open cup and whose bottom bears an emitting antenna of the magnetron oriented towards the opening of the cup which has a flange glued to the inner face of the inner layer.

Advantageously, the wing comprises a waveguide fixed to the inner face of the inner layer, produced in the form of a metal lattice which is passed through by an emitting antenna of the magnetron which is oriented outwards.

The invention also proposes an aircraft comprising at least one wing according to one of the preceding variants.

BRIEF DESCRIPTION OF THE DRAWINGS

The features of the invention mentioned above, and others, will become more clearly apparent on reading the following description of an exemplary embodiment, the description being given in relation to the attached drawings, in which.

DETAILED DESCRIPTION OF THE PREFERRED EMBODIMENTS

Figure 1:
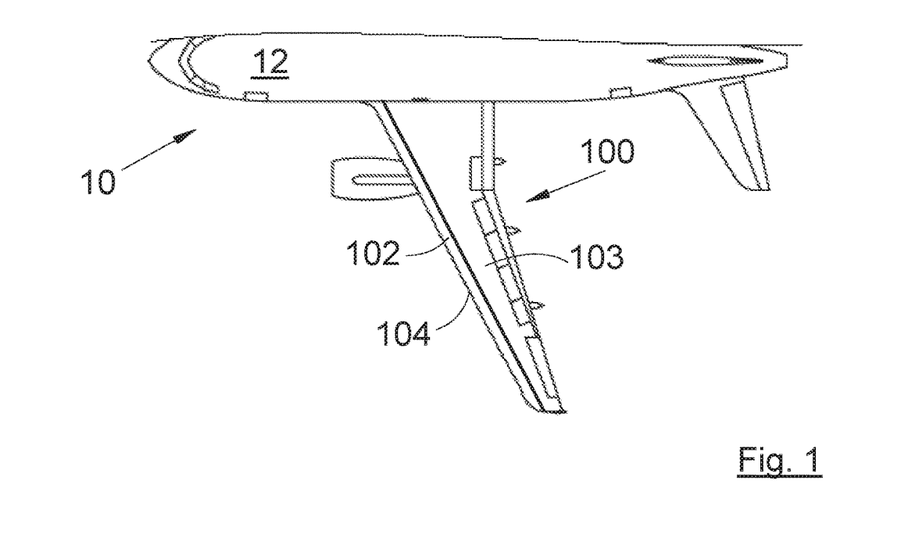
FIG. 1 shows a partial plan view of an aircraft according to the invention.

FIG. 1 shows a partial view of an aircraft 10 which has a fuselage 12 on either side of which is fixed a wing 100 which has a main part 103 and a leading edge 102 which extends above and below the wing 100 in front of the main part 103. The reference 104 shows a leading edge line which is the line of separation between the lower surface and the upper surface of the leading edge 102.

Figure 2:
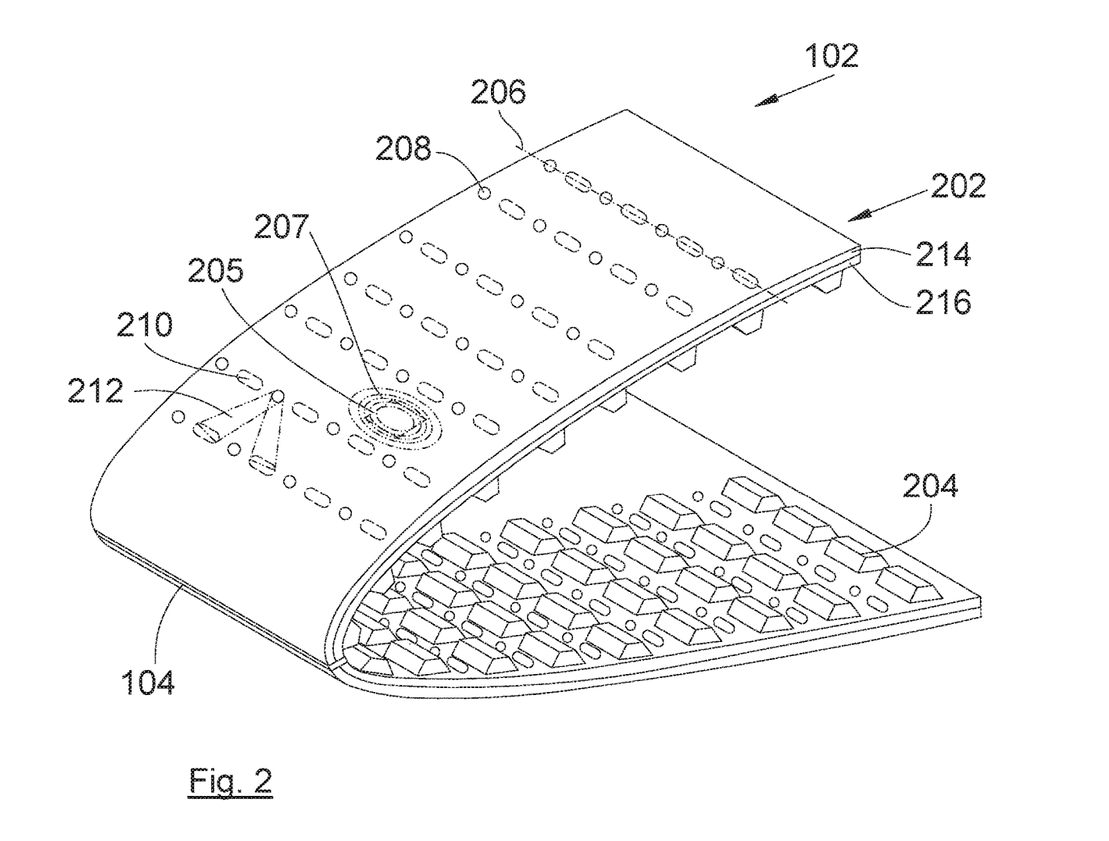
FIG. 2 shows a perspective view of a leading edge of a wing according to the invention.

FIG. 2 shows the leading edge 102 in cross section. The leading edge 102 is composed of a skin 202 which is transparent to microwaves extending between 1 GHz and 300 GHz and which comprises an outer face over which the air flows and an inner face oriented towards the interior of the leading edge 102.

A plurality of magnetrons 204 is implanted under the skin 202. The magnetrons 204 are arranged in rows and in columns alongside one another. The number and the separation of the magnetrons 204 are chosen to best cover the leading edge 102. Each magnetron 204 is electrically powered by an appropriate power module which is itself driven by a control unit provided for this purpose and which comprises, in particular, a processor. Each magnetron 204 can thus be powered and emit microwaves 207, or be stopped and not transmit microwaves. The power module can be common to several magnetrons 204 and thus several magnetrons 204 can be powered by one and the same power module. The installation thus comprises at least one power module provided to electrically power the plurality of magnetrons 204.

According to a variant, the magnetrons 204 are arranged in the skin 202.

The reference 205 represents the hidden footprint of a magnetron 204 seen from the outside of the leading edge 102.

Between two successive rows of magnetrons 204, there is a discharge row 206 successively comprising an electrode 208 and a ground electrode 210. As is explained hereinbelow, this installation allows for the generation of an electrical discharge between an electrode 208 and a ground electrode 210 which in its turn generates a plasma 212.

Each electrode 208 passes through the skin 202 and therefore emerges on the outside and can be flush with the outer face of the skin 202, extend as an extra thickness, or be set back. For the purposes of ease of implementation, the electrodes 208 have a circular section compatible with a circular hole produced in the skin 202.

Each ground electrode 210 is under the skin 202 which then constitutes a dielectric between the ground electrode 210 and the electrode 208.

Along the leading edge line 104, there is arranged a row of ground electrodes 210 which can thus cooperate with the electrodes 208 of the first discharge row present on the upper surface and the first discharge row present on the lower surface.

Figures 8, 9:
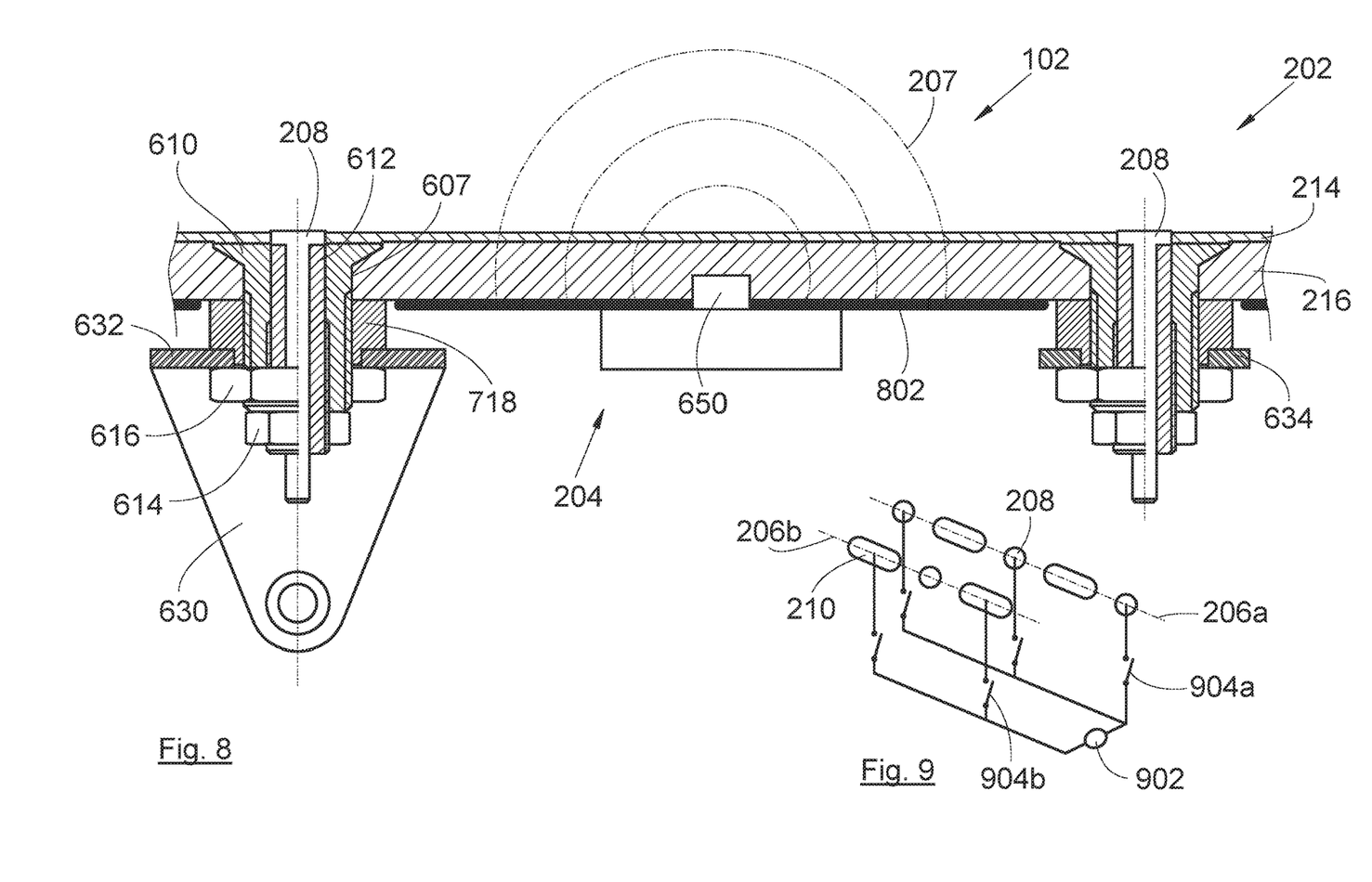
FIG. 8 shows a cross-sectional view of a mounting of a microwave feed according to a third embodiment.
FIG. 9 is a schematic representation of an electrical setup.

FIG. 9 shows an example of electrical installation between two adjacent discharge rows 206a-b.

For each group composed of an electrode 208 of a discharge row 206a and of at least one ground electrode 210 of an adjacent discharge row 206b, a voltage generator 902 connected between the electrode 208 and the at least one ground electrode 210 is provided. When the voltage generator 902 is activated, it makes it possible to apply a potential difference between the electrode 208 and the at least one ground electrode 210 of the same group. The potential difference must be sufficient to allow the creation of a plasma between the electrode 208 and the ground electrode 210. The voltage generator 902 is also driven by the control unit.

In order to widen the path appropriated by the plasma 212 on the outer face of the skin 202, each ground electrode 210 has a certain extent.

Thus, either regularly or according to the needs as is explained hereinbelow, the or certain magnetrons 204 are powered and generate microwaves, and simultaneously or sequentially, certain voltage generators 902 are activated to generate plasmas. The combination of the plasmas and of the microwaves makes it possible to eliminate the residues which are attached to the leading edge 102, whether these residues are organic or ice. Thus, the laminar flow over the leading edge 102 is retained.

As specified above, the activation of the voltage generators 902 and of the magnetrons 204 can be periodic, but, for electrical consumption reasons, it is preferable for the activation to be linked to a detection of non-laminar flows. Thus, after having detected that, over certain areas of the leading edge 102, the flows are no longer laminar, the voltage generators 902 and the magnetrons 204 of these areas are activated. This detection is made, for example, visually by the pilot, or by an infrared camera which captures images of the wing 100 and an analysis system which receives these images and performs a thermographic analysis of these images to determine the areas of the leading edge 102 where the flows are no longer laminar. The analysis system can then inform the control unit which activates the voltage generators 902 and the magnetrons 204 of these areas and these activations will last until the flow over the wing 100 has reverted to a laminar state.

As FIG. 9 shows, one and the same voltage generator 902 can power all of a row of electrodes 208 and all of a row of ground electrodes 210, and, to allow a selection of a particular electrode 208 of a discharge row 206a and a ground electrode 210 of an adjacent discharge row 206b, in order to best target the position of the plasma, it is desirable to implement a selection system which makes it possible to connect only the electrode/electrodes 208 and the ground electrode/electrodes 210 desired according to the analysis of the flows.

The selection system is, for example, composed, for each electrode 208 and for each ground electrode 210, of a controlled switch 904a-b connected in series between the voltage generator 902 and, respectively, the electrode 208 or the ground electrode 210.

Based on the analysis of the flows, the control unit can then control the appropriate controlled switches 904a-b to generate a plasma between the appropriate electrode 208 and ground electrode 210.

Figure 3:
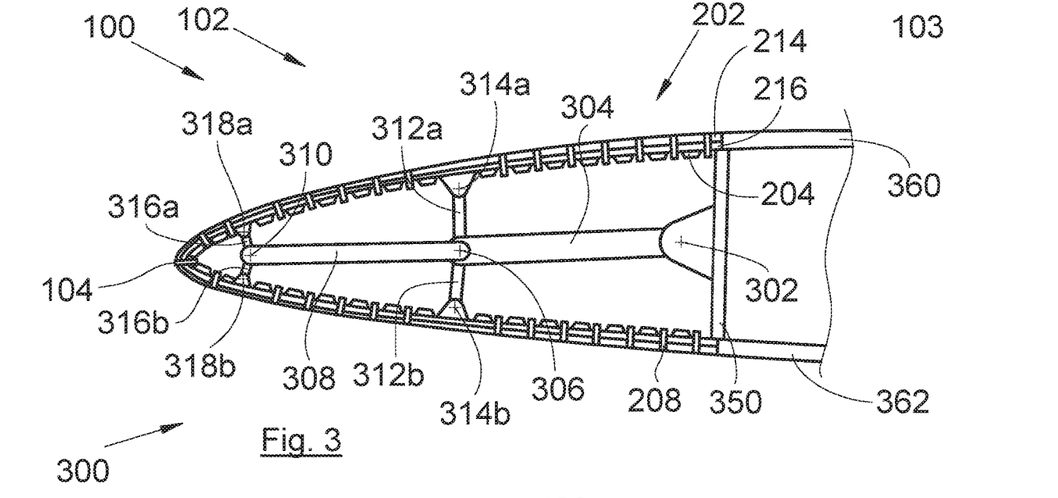
FIG. 3 shows a cross-sectional side view of a leading edge of a wing according to a variant of the invention.

FIG. 3 shows a cross section of the wing 100 with the leading edge 102 and the main part 103. The leading edge 102 is equipped with a displacement system 300 which is provided to displace the leading edge 102 upwards and downwards. This displacement makes it possible to detach the ice which would be stuck to the outer face of the skin 202.

The skin 202 prolongs the top skin 360 of the upper surface of the main part 103 and the bottom skin 362 of the lower surface of the main part 103. This freedom of displacement allows an increase in the maximum angle of attack (high lift function) necessary to the take-off and to the landing of the aircraft.

The skin 202 is flexible which allows the flexing thereof. According to a particular embodiment, the skin 202 is two-layer and comprises a flexible outer layer 214, in particular made of silicone or of an equivalent material, such as a resin, paint or varnish, for example, and an inner layer 216 ensuring the strength and composed of a matrix of quartz fibers or an equivalent material. The outer layer 214 has a thickness of a few millimeters, and the inner layer 216 has a variable thickness depending on its location and the forces that it is likely to absorb. The inner layer 216 allows the flexing of the leading edge 102 during the action of the displacement system 300 while ensuring the strength of the outer layer 214 and avoids the sagging thereof.

Such a surface coating is also highly tolerant to small impacts (tools, gravel, spotloads), to the technical fluids (oils, greases, hydraulic fluids, kerosene, petrol, aromatics, etc.) and highly resistant to the attacks from the external natural environment (rain, hail, frost, sun, UV, etc.).

Such a surface coating maintains a surface condition favorable to a laminar flow despite the mechanical attacks that it undergoes, because it is highly resilient. Furthermore, such a surface coating exhibits a low roughness and tight tolerances of form, in particular by molding, which make it possible to ensure a laminar flow.

In the embodiment of the invention presented in FIG. 3, the displacement system 300 is composed of a set of connecting rods, each being mounted between two bearings and of actuators which are mounted on a structure 350 of the main part 103.

The displacement system 300 comprises:
a main bearing 302 mounted on the structure 350,
a main connecting rod 304 of which a first end is mounted articulated on the main bearing 302 and of which a second end bears a secondary bearing 306 situated here substantially at the center of the leading edge 102,
a secondary connecting rod 308 of which a first end is mounted articulated on the secondary bearing 306 and of which a second end bears a terminal bearing 310 situated here substantially behind the leading edge line 104,
a pair of lateral connecting rods 312a-b, of which a first end of each lateral connecting rod 312a-b is mounted articulated on the secondary bearing 306, of which a second end of a first lateral connecting rod 312a is mounted articulated on a first lateral bearing 314a secured to the upper surface of the leading edge 102, and of which a second end of a second lateral connecting rod 312b is mounted articulated on a second lateral bearing 314a secured to the lower surface of the leading edge 102,
a pair of terminal connecting rods 316a-b, of which a first end of each terminal connecting rod 316a-b is mounted articulated on the terminal bearing 310, of which a second end of a first terminal connecting rod 316a is mounted articulated on a first terminal bearing 318a secured to the upper surface of the leading edge 102, and of which a second end of a second terminal connecting rod 316b is mounted articulated on a second terminal bearing 318a secured to the lower surface of the leading edge 102,
actuators controlled by a command unit and provided to displace the different connecting rods.

The command unit and the control unit can be two different units communicating with one another or they can be grouped together in one and the same overall control unit.

Each actuator is, for example, a motor arranged at each of the main 302, secondary 306 and terminal 310 bearings and provided to turn the connecting rods which are fixed to them. Obviously, the actuators can also be electrical, magnetic, hydraulic or pneumatic cylinders.

The displacement of the leading edge 102 is activated simultaneously with the activation of the voltage generators and of the magnetrons 204 as has been described above.

Figure 4:
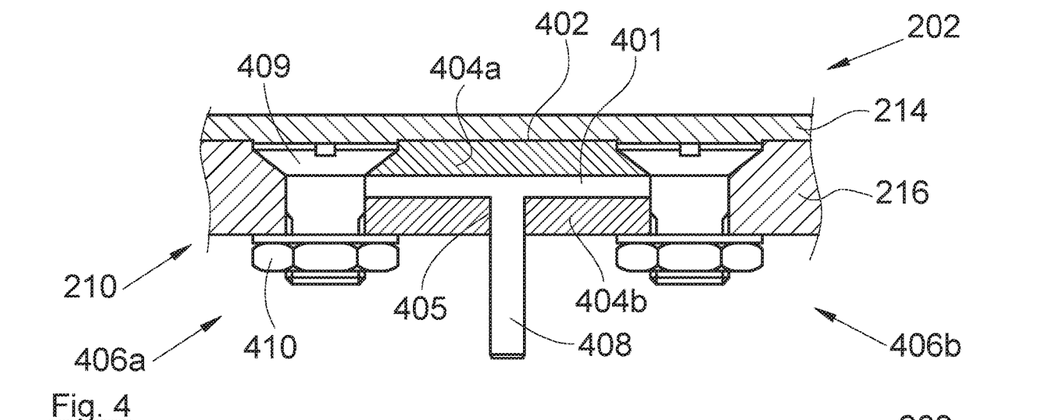
FIG. 4 shows a cross-sectional view of a particular mounting of a ground electrode according to a first embodiment.

FIG. 4 shows a particular embodiment of a ground electrode 210 in the case where the skin 202 is two-layer as described above and where the inner layer 216 of the skin 202 is pierced by a window 402 in which is housed the ground electrode 210.

The ground electrode 210 comprises an outer plate 404a, an inner plate 404b, each having dielectric properties, such as ceramic plates, for example, and an electrically conductive plate 401 sandwiched between the outer plate 404a and the inner plate 404b.

The outer plate 404a is oriented towards the outside of the leading edge 102 and is therefore located pressed against the outer layer 214 and the inner plate 404b is oriented towards the interior of the leading edge 102 and is pierced by a bore 405 allowing the passage of an electrically conductive rod 408 secured to the plate 401 and to which the voltage generator is connected.

To ensure the securing of the plate 401, of the outer plate 404a and of the inner plate 404b, the ground electrode 210 comprises two bolts 406a-b which sandwich the outer plate 404a, the plate 401 and the inner plate 404b. Each bolt 406a-b has a screw 409 and a nut 410, the screw head bearing against the outer face of the outer plate 404a and against the outer face of the inner layer 216, and the nut 410 bearing against the inner face of the inner plate 404b and the inner face of the inner layer 216.

The sandwiching of the inner layer 216 by the bolts 406a-b ensures that the ground electrode 210 is held in position.

The mounting of the ground electrode 210 entails placing the outer plate 404a, the plate 401 and the inner plate 404b in the window 402, fitting and tightening the two bolts 406a-b, then placing the outer layer 214 against the inner layer 216 and the outer plate 404a.

To avoid having the heads of the screws 409 create an overthickness which would be on the outer layer 214, the heads of the screws 409 are countersunk and, for each screw 409, the inner layer 216 has a countersink to accommodate the head of the screw 409.

Figure 5:
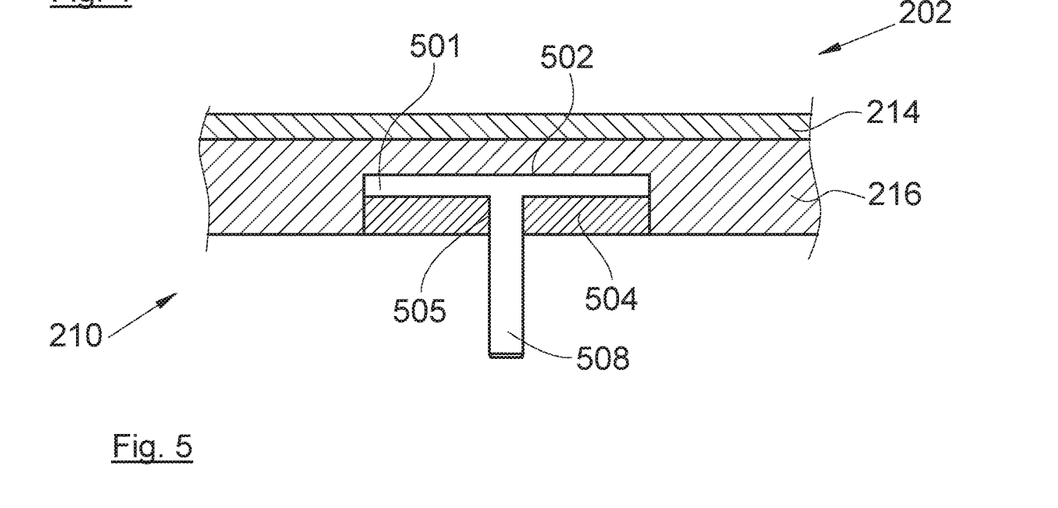
FIG. 5 shows a cross-sectional view of a particular mounting of a ground electrode according to a second embodiment.

FIG. 5 shows a particular embodiment of a ground electrode 210 in the case where the skin 202 is two-layer as described above and where the inner layer 216 of the skin 202 has a void 502 which is open towards the interior of the leading edge 102 and in which is housed the ground electrode 210. In the embodiment of the invention presented here, the void 502 is not a through-void, but it can be.

The ground electrode 210 comprises a plate 504 having dielectric properties, such as a ceramic plate, for example, and an electrically conductive plate 501 sandwiched between the bottom of the void 502 and the plate 504.

The plate 504 is oriented towards the interior of the leading edge 102 and is pierced by a bore 505 allowing the passage of an electrically conductive rod 508 secured to the plate 501 and to which the voltage generator is connected.

The securing of the plate 501 and of the plate 504 on the inner layer 216 is produced, for example, by bonding.

Figure 6:
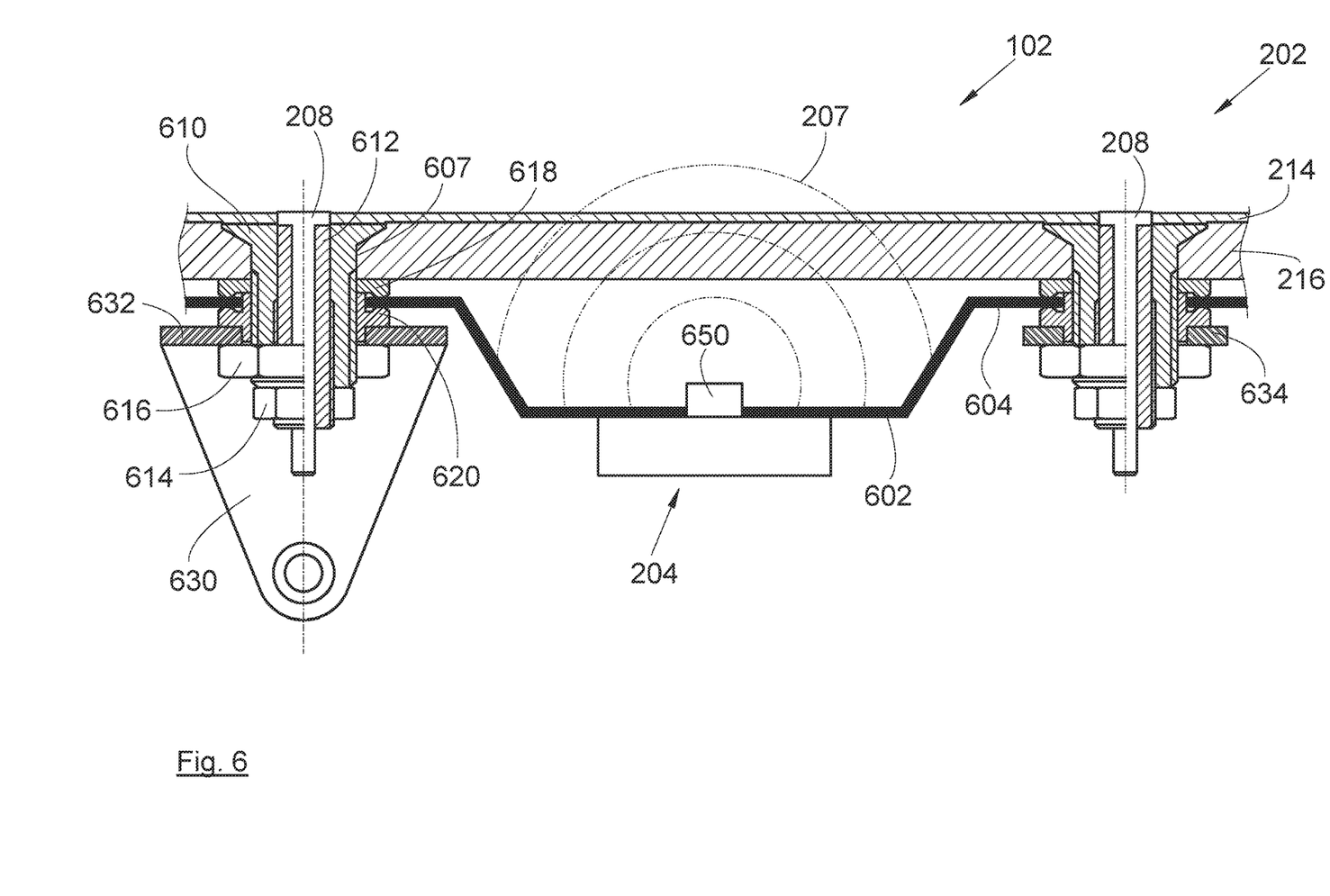
FIG. 6 shows a cross-sectional view of a mounting of a microwave feed according to a first embodiment.
Figure 7:
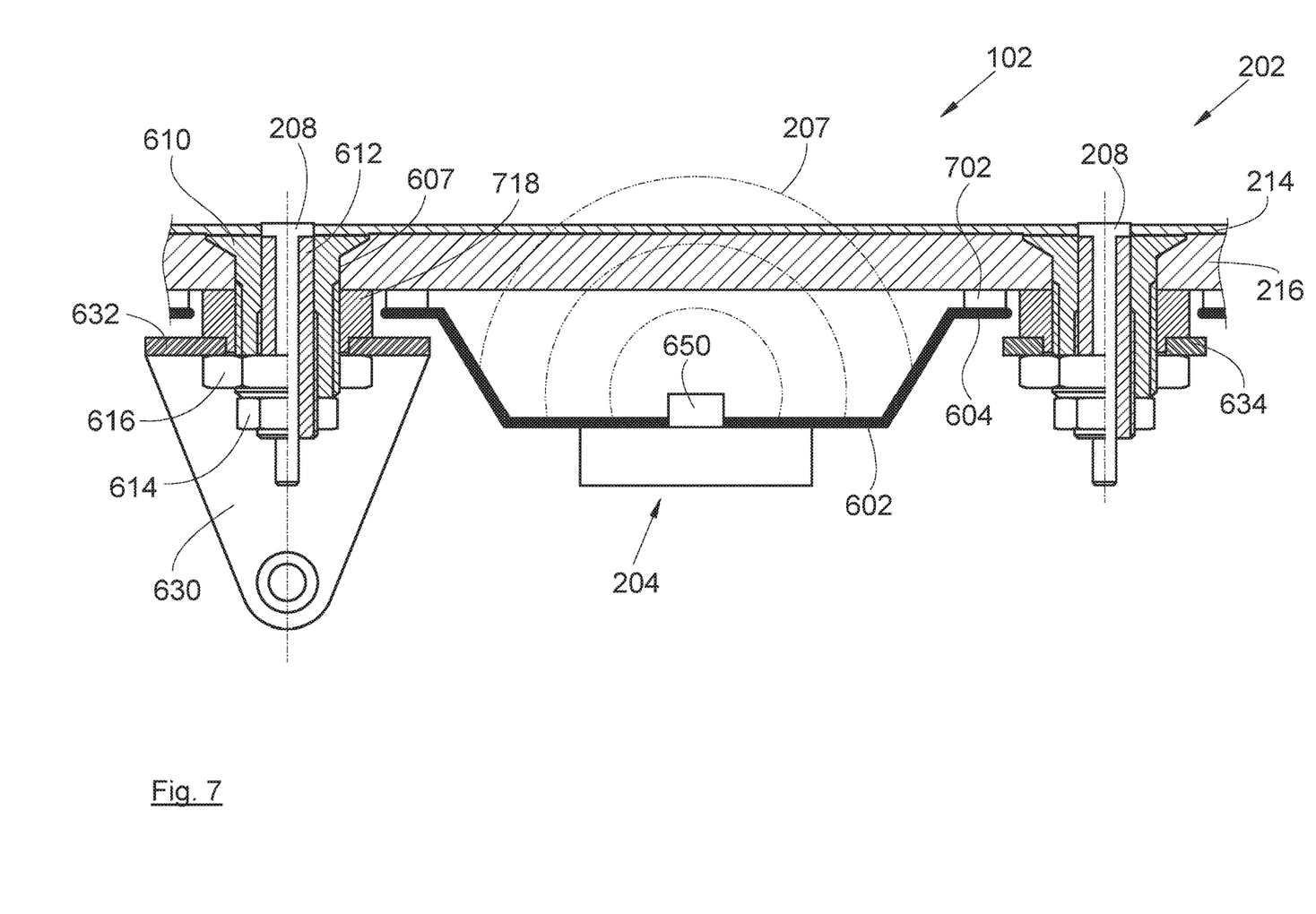
FIG. 7 shows a cross-sectional view of a mounting of a microwave feed according to a second embodiment.

FIG. 6 shows a first embodiment of the fixing of a magnetron 204 and of electrodes 208, FIG. 7 shows a second embodiment of the fixing of a magnetron 204 and of electrodes 208 in the case where the skin 202 is two-layer as described above, and FIG. 8 shows a third embodiment of the fixing of a magnetron 204 and of electrodes 208.

In each of the embodiments of FIGS. 6 to 8, for each magnetron 204, the installation comprises a waveguide 602, 802 which is fixed inside the leading edge 102, that is to say, on the side of the inner face of the inner layer 216. The magnetron 204 comprises an emitting antenna 650 which emits the microwaves generated by the magnetron 204.

In the embodiments of FIGS. 6 and 7, the waveguide 602 is produced here in the form of a cup which is open towards the outside and whose bottom bears the emitting antenna 650 oriented towards the opening of the cup. Thus, the emitting antenna 650 emits the microwaves inside the waveguide 602 which directs the microwaves 207 towards the outside by passing in succession through the inner layer 216 then the outer layer 214.

At its opening, the waveguide 602 has a flange 604 which is fixed to the leading edge 102.

In the first embodiment, the fixing of the flange 604 is effected by sandwiching in a screw-nut system which is described below, and in the second embodiment, the fixing of the flange 604 is effected by the application of a glue 702 between the inner face of the inner layer 216 and the flange 604.

When the leading edge 102 is displaced under the effect of the displacement system 300, the waveguide 602 and the glue 702 when present are sufficiently flexible to absorb the deformations.

The electrode 208 takes the form of a rod with flat head.

For each electrode 208, the inner layer 216 has a through-bore 607 with a countersink on the side of its outer face.

The fixing of the electrode 208 comprises:
a main stem 610 having a threaded rod passing through the bore 607 and a countersunk head accommodated in the countersink, and where the interior of the main stem 610 is tapped,
a secondary stem 612 which is accommodated in the main stem 610, where the outer face is threaded to cooperate with the inner tapping of the main stem 610, and where the secondary stem 612 extends beyond the main stem 610 on the side opposite the head of the main stem 610,
a first nut 614 which is screwed onto the end of the secondary stem 612 which extends beyond the main stem 610 and which bears against the main stem 610.

The interior of the secondary stem 612 is smooth to accommodate the rod of the electrode 208 while the flat head of the electrode 208 remains on the side of the countersunk head of the main stem 610 and in a hole of the outer layer 214 provided for this purpose. The rod of the electrode 208 extends beyond the secondary stem 612 beyond the first nut 614 to be connected to the voltage generator.

To ensure the fixing of the main stem 610, the installation comprises a second nut 616 which cooperates with the threaded rod of the main stem 610 to sandwich the inner layer 216 between the countersunk head of the main stem 610 and the second nut 616.

In order to ensure the fixing of the flange 604 of the waveguide 602, the installation comprises:
a first clamping nut 618 which is screwed onto the threaded rod of the main stem 610, between the second nut 616 and the inner layer 216, and bears against the inner layer 216,
a second clamping nut 620 which is screwed onto the threaded rod of the main stem 610, between the second nut 616 and the first clamping nut 618, and is tightened against the first clamping nut 618, sandwiching the flange 604.

In the second embodiment of FIG. 7, the first clamping nut 618 and the second clamping nut 620 are replaced by a spacer 718 to allow the passage of the flange 604, but, depending on the configuration of the flange, the spacer 718 may be absent.

When a lateral connecting rod 312a-b or a terminal connecting rod 316a-b has to be fixed to the skin 202 via a lateral bearing 314a-b or a terminal bearing 318a-b, the installation comprises a yoke joint 630 which bears the lateral bearing 314a-b or the terminal bearing 318a-b and whose base 632 has a piercing which allows the introduction of the main stem 610 and the sandwiching of the base 632 between the second clamping nut 620 and the second nut 616. Depending on the configuration, the second clamping nut 620 can be replaced by the spacer 718, or the inner layer 216.

When the yoke joint 630 is not present, it can be replaced by a washer 634.

The main stem 610, the secondary stem 612, the first nut 614, the second nut 616, the first clamping nut 618, the second clamping nut 620, the spacer 718, the yoke joint 630 are produced in electrically insulating materials such as ceramic, for example.

In the third embodiment, the waveguide 802 takes the form of a metal lattice fixed against the inner face of the inner layer 216 to which the magnetrons 204 are fixed and through which passes the emitting antenna 650. The waveguide 802 is spread out so as to be able to be used for several magnetrons 204.

The emitting antenna 650 is thus oriented outwards relative to the waveguide 802 and the body of the magnetron 204 is oriented towards the interior of the leading edge 102.

The waveguide 802 guides the microwaves outwards and ensures a protection against lightning.

The fixing of the magnetron 204 on the waveguide 802 is ensured by bonding using a glue that is sufficiently flexible to absorb the deformations between the waveguide 802 and the magnetron 204.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A wing of an aircraft, said wing comprising:
a leading edge composed of a skin transparent to microwaves,
a plurality of magnetrons which are implanted under the skin and arranged in rows and in columns alongside one another,
at least one power module provided to electrically power said plurality of magnetrons,
between two successive rows of magnetrons, a discharge row successively comprising an electrode and a ground electrode, where each electrode passes through the skin and where each ground electrode is under the skin,
for each group composed of an electrode of a discharge row and of at least one ground electrode of an adjacent discharge row, a voltage generator connected between said electrode and said at least one ground electrode.

2. The wing according to claim 1, wherein the skin is two-layer and comprises a flexible outer layer and an inner layer which ensures its strength.

3. The wing according to claim 2, wherein the leading edge comprises a displacement system provided to displace the leading edge upwards and downwards.

4. The wing according to claim 2, wherein the inner layer is pierced by a window in which is housed the ground electrode, wherein the ground electrode comprises an outer plate, an inner plate, each having dielectric properties, and an electrically conductive plate, secured to an electrically conductive rod and sandwiched between the outer plate and the inner plate, and two bolts sandwiching the outer plate, the plate and the inner plate, and the inner layer, and wherein the inner plate is pierced by a bore into which the rod passes to be connected to the voltage generator.

5. The wing according to claim 2, wherein the inner layer has a void open towards the interior of the leading edge and in which is housed the ground electrode, wherein the ground electrode comprises a plate having dielectric properties and an electrically conductive plate, secured to an electrically conductive rod and sandwiched between the bottom of the void and the plate, and wherein the plate is pierced by a bore into which the rod passes to be connected to the voltage generator.

6. The wing according to claim 2, wherein the outer layer has a hole, the inner layer has a through-bore with a countersink on the side of its outer face, the electrode is a rod with a flat head where the flat head is accommodated in the hole of the outer layer, and the wing comprises:
a main stem having a threaded rod passing through the bore and a countersunk head accommodated in the countersink, and where an interior of the main stem is tapped,
a secondary stem which is accommodated in the main stem, where an outer face is threaded to cooperate with the inner tapping of the main stem, and where the secondary stem extends beyond the main stem on a side opposite a head of the main stem,
a first nut which is screwed onto an end of the secondary stem which extends beyond the main stem and which bears against the main stem,
wherein an interior of the secondary stem accommodates the rod of the electrode which extends beyond the secondary stem beyond the first nut to be connected to the voltage generator.

7. The wing according to claim 6, further comprising:
for each magnetron, a waveguide fixed inside the leading edge, produced as an outwardly-open cup and whose bottom bears an emitting antenna of the magnetron oriented towards an opening of the cup which has a flange,
a first clamping nut which is screwed onto the threaded rod of the main stem, between the first nut and the inner layer, and bears against the inner layer,
a second clamping nut which is screwed onto the threaded rod of the main stem, between the first nut and the first clamping nut, and is tightened against the first clamping nut sandwiching the flange.

8. The wing according to claim 2, further comprising, for each magnetron, a waveguide fixed inside the leading edge, produced as an outwardly-open cup and whose bottom bears an emitting antenna of the magnetron oriented towards an opening of the cup which has a flange glued to an inner face of the inner layer.

9. The wing according to claim 2, further comprising a waveguide fixed to an inner face of the inner layer, produced as a metal lattice which is passed through by an emitting antenna of the magnetron which is oriented outwards.

10. An aircraft comprising at least one wing according to claim 1.

* * * * *